(12) United States Patent
Nakagawa et al.

(10) Patent No.: US 9,186,620 B2
(45) Date of Patent: Nov. 17, 2015

(54) $CO_2$ RECOVERY DEVICE

(71) Applicant: MITSUBISHI HEAVY INDUSTRIES, LTD., Tokyo (JP)

(72) Inventors: Yosuke Nakagawa, Tokyo (JP); Naohiko Ishibashi, Tokyo (JP); Hiromitsu Nagayasu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/347,182

(22) PCT Filed: Oct. 30, 2012

(86) PCT No.: PCT/JP2012/006940
§ 371 (c)(1),
(2) Date: Mar. 25, 2014

(87) PCT Pub. No.: WO2013/114488
PCT Pub. Date: Aug. 8, 2013

(65) Prior Publication Data
US 2014/0373720 A1     Dec. 25, 2014

(30) Foreign Application Priority Data
Feb. 3, 2012   (JP) ................ 2012-021940

(51) Int. Cl.
    *B01D 53/14*     (2006.01)
    *B01D 53/62*     (2006.01)

(52) U.S. Cl.
    CPC ........ *B01D 53/1475* (2013.01); *B01D 53/1412* (2013.01); *B01D 53/62* (2013.01); *Y02C 10/04* (2013.01); *Y02C 10/06* (2013.01)

(58) Field of Classification Search
None
See application file for complete search history.

(56) References Cited

U.S. PATENT DOCUMENTS 4,491,566 A   *   1/1985   Adams et al. ................ 423/220
5,085,839 A   *   2/1992   Scott et al. .................... 423/210

(Continued)

FOREIGN PATENT DOCUMENTS

| JP | 2010-17617 A | 1/2010 |
| JP | 2011-527 A | 1/2011 |
| JP | 2011-528 A | 1/2011 |

OTHER PUBLICATIONS

International Search Report dated Feb. 19, 2013 issued in corresponding application No. PCT/JP2012/006940.

*Primary Examiner* — Duane Smith
*Assistant Examiner* — Phillip Shao
(74) *Attorney, Agent, or Firm* — Westerman, Hattori, Daniels & Adrian, LLP

(57) ABSTRACT

A target treatment volume for exhaust gas to be treated is specified based on the product of an actual flow rate of exhaust gas discharged toward a $CO_2$ recovery device, and an exhaust gas treatment rate $R_{G1}$, and a target recovery volume for $CO_2$ to be recovered by the recovery device is specified based on the product of an actual volume of $CO_2$ contained in the exhaust gas discharged from the generation source of the exhaust gas, the exhaust gas treatment rate $R_{G1}$, and a $CO_2$ recovery rate $R_{CO2}$.

$$R_{G1} = T_{CO2}/V_{G1}$$

$V_{G1}$: Flow rate of exhaust gas discharged from generation source of exhaust gas
$T_{CO2}$: Volume of exhaust gas to be treated by recovery device $$R_{CO2} = C_{CO2}/V_{CO2}$$

$V_{CO2}$: Volume of $CO_2$ contained in exhaust gas to be treated by recovery device
$C_{CO2}$: Volume of $CO_2$ to be recovered by recovery device.

6 Claims, 8 Drawing Sheets

(56) References Cited

U.S. PATENT DOCUMENTS

| | | | |
|---|---|---|---|
| 6,066,304 A * | 5/2000 | Freetly et al. | 423/243.06 |
| 8,414,694 B2 * | 4/2013 | Iijima et al. | 96/251 |
| 2004/0109800 A1 * | 6/2004 | Pahlman et al. | 423/210 |
| 2010/0005722 A1 * | 1/2010 | Iijima et al. | 48/128 |
| 2010/0319531 A1 * | 12/2010 | Iijima et al. | 95/11 |

* cited by examiner

$CO_2$ RECOVERY DEVICE

TECHNICAL FIELD

The present invention relates to a $CO_2$ recovery device that can cause a recovery rate to follow fluctuations of the volume of exhaust gas accompanied with fluctuations of the load of an apparatus located on an upstream side.

BACKGROUND ART

In recent years, carbon dioxide (hereinafter referred to as $CO_2$) is pointed out as one of causes of the global warming phenomenon. Therefore, a method of bringing a combustion gas of a boiler into contact with an absorbent and eliminating and recovering $CO_2$ in the combustion gas, and a method of storing the recovered $CO_2$ without discharging the $CO_2$ to the atmospheric have been extensively studied for, for example, power generation facilities, such as a thermoelectric power plant that uses a large quantity of fossil fuels.

$CO_2$ recovery devices include, as basic constituent elements, an absorption tower that causes $CO_2$ in gas to be absorbed into an absorbent, and a regeneration tower that separates $CO_2$ from the absorbent. In order to properly operate the $CO_2$ recovery devices, several proposals as shown below have been made up to now.

The volume of exhaust gas required for attaining an objective is determined from a target $CO_2$ recovery volume and $CO_2$ concentration in the exhaust gas, and the exhaust gas is supplied to a $CO_2$ recovery device (for example, PTL 1).

The volume of exhaust gas from an exhaust gas source (a boiler or a gas turbine installed upstream of a $CO_2$ recovery device) and $CO_2$ concentration in the exhaust gas are measured, and operation parameters required for achieving a target $CO_2$ recovery rate are determined (for example, PTL 2).

The flow rate of the gas discharged to the atmosphere through a chimney without being treated by a $CO_2$ recovery device, and the composition of this gas are measured using the gas from an exhaust gas source, and the volume of exhaust gas to be supplied to the $CO_2$ recovery device is determined so as not to produce a stream that flows into the chimney from the atmosphere (for example, PTL 3).

CITATION LIST

Patent Literature

[PTL 1]: Japanese Unexamined Patent Application Publication No. 2011-527
[PTL 2]: Japanese Unexamined Patent Application Publication No. 2011-528
[PTL 3]: Japanese Unexamined Patent Application Publication No. 2010-17617

SUMMARY OF INVENTION

Technical Problem

Meanwhile, in PTL 1, an exhaust gas flow rate required to recover the target $CO_2$ recovery volume is calculated, and the exhaust gas is sent into the $CO_2$ recovery device. Therefore, when a constant rate of exhaust gas is treated in plants like power plants where load fluctuates, it is necessary to set target values every time in accordance with fluctuations of the target $CO_2$ recovery volume.

Additionally, in order to make $CO_2$ emission reduction and cost compatible with each other, a $CO_2$ device capable of treating a portion of the exhaust gas and recovering $CO_2$ (partial treatment) is expected. However, the proposals of PTLs 2 and 3 merely show a method of controlling the volume of the exhaust gas in a case when all the exhaust gas is drawn into the $CO_2$ recovery device, and this proposal cannot cope with the partial treatment of the exhaust gas that treats a portion of the exhaust gas.

The invention has been made on the basis of such technical problems, and an object thereof is to provide a $CO_2$ recovery device that can cause the recovery rate of $CO_2$ to follow a constant rate and can partially treat exhaust gas, even if the load on an upstream side fluctuates and the volume of the exhaust gas fluctuates.

Solution to Problem

A $CO_2$ recovery device of the invention includes a $CO_2$ absorption tower that brings an exhaust gas containing $CO_2$ into contact with an absorbent to eliminate $CO_2$ in the exhaust gas; and a regeneration tower that eliminates and regenerates $CO_2$ in a rich solution that has absorbed $CO_2$ in the $CO_2$ absorption tower, and the absorbent, which is a lean solution from which $CO_2$ is eliminated in the regeneration tower, is reused in the $CO_2$ absorption tower.

The $CO_2$ recovery device of the invention sets an exhaust gas treatment rate $R_{G1}$ and a $CO_2$ recovery rate $R_{CO2}$ shown below as operation parameters of the $CO_2$ recovery device.

A target treatment volume for exhaust gas to be treated by the $CO_2$ recovery device is specified on the basis of the product of an actual flow rate of the exhaust gas discharged toward the $CO_2$ recovery device from a generation source of the exhaust gas, and the exhaust gas treatment rate $R_{G1}$.

Additionally, a target recovery volume for $CO_2$ to be recovered by the $CO_2$ recovery device is specified on the basis of the product of an actual volume of $CO_2$ contained in the exhaust gas discharged from the generation source of the exhaust gas to the $CO_2$ recovery device, the exhaust gas treatment rate $R_{G1}$, and the $CO_2$ recovery rate $R_{CO2}$.

$$R_{G1} = T_{CO2}/V_{G1}$$

$V_{G1}$: Flow rate of exhaust gas discharged from generation source of exhaust gas
$T_{CO2}$: Volume of exhaust gas to be treated by $CO_2$ recovery device $$R_{CO2} = C_{CO2}/V_{CO2}$$

$V_{CO2}$: Volume of $CO_2$ contained in exhaust gas to be treated by $CO_2$ recovery device
$C_{CO2}$: Volume of $CO_2$ to be recovered by $CO_2$ recovery device In $CO_2$ recovery device of the invention, the actual flow rate of the exhaust gas and the actual volume of $CO_2$ contained in the exhaust gas can be directly obtained by measuring the exhaust gas. Additionally, the actual flow rate of the exhaust gas can be indirectly obtained by calculation based on a flow rate of fuel and a flow rate of combustion gas to be supplied to the generation source of the exhaust gas, and the actual volume of $CO_2$ contained in the exhaust gas can be indirectly obtained by calculation on the basis of the flow rates and composition of the fuel and the combustion gas.

In the $CO_2$ recovery device of the invention, preferably, if a load of the generation source of the exhaust gas fluctuates beyond a predetermined value, the actual flow rate of the exhaust gas is obtained by collating data in which a load to the generation source of the exhaust gas and the flow rate of the exhaust gas are matched, with a load command signal to the generation source of the exhaust gas, and the target recovery volume of the $CO_2$ is specified.

Then, the followability to load fluctuations is improved.

In the $CO_2$ recovery device of the invention, an upper limit can be set to the recovery volume of $CO_2$ on the basis of the load of the generation source of exhaust gas.

When, for example, the steam to be consumed in an upstream plant is used for a power source of the $CO_2$ recovery device, if the volume of the steam to be consumed by the $CO_2$ recovery device increases too much, there is a concern that the volume of the steam that can be consumed by the upstream plant is just as scarce. Therefore, the volume of the steam to be consumed by the $CO_2$ recovery device is limited by setting an upper limit to the $CO_2$ recovery volume in the $CO_2$ recovery device.

In the $CO_2$ recovery device of the invention, a target value of an absorbent circulation flow rate can be set on the basis of the load of the generation source of the exhaust gas.

Then, even if the exhaust gas flow rate fluctuates abruptly, the load followability can be improved by fluctuating the absorbent circulation flow rate so as to follow this flow rate.

Advantageous Effects of Invention

According to the invention, provided is a $CO_2$ recovery device that can cause the recovery rate of $CO_2$ to follow a constant rate and can partially treat exhaust gas, even if the load on an upstream side fluctuates and the volume of the exhaust gas fluctuates.

DESCRIPTION OF EMBODIMENTS

Basic Configuration of $CO_2$ Recovery Device

Although several embodiments of the invention will be described below, the basic configuration of a $CO_2$ recovery device to be applied is the same in any embodiment. Therefore, the $CO_2$ recovery device will first be described.

Figure 1:
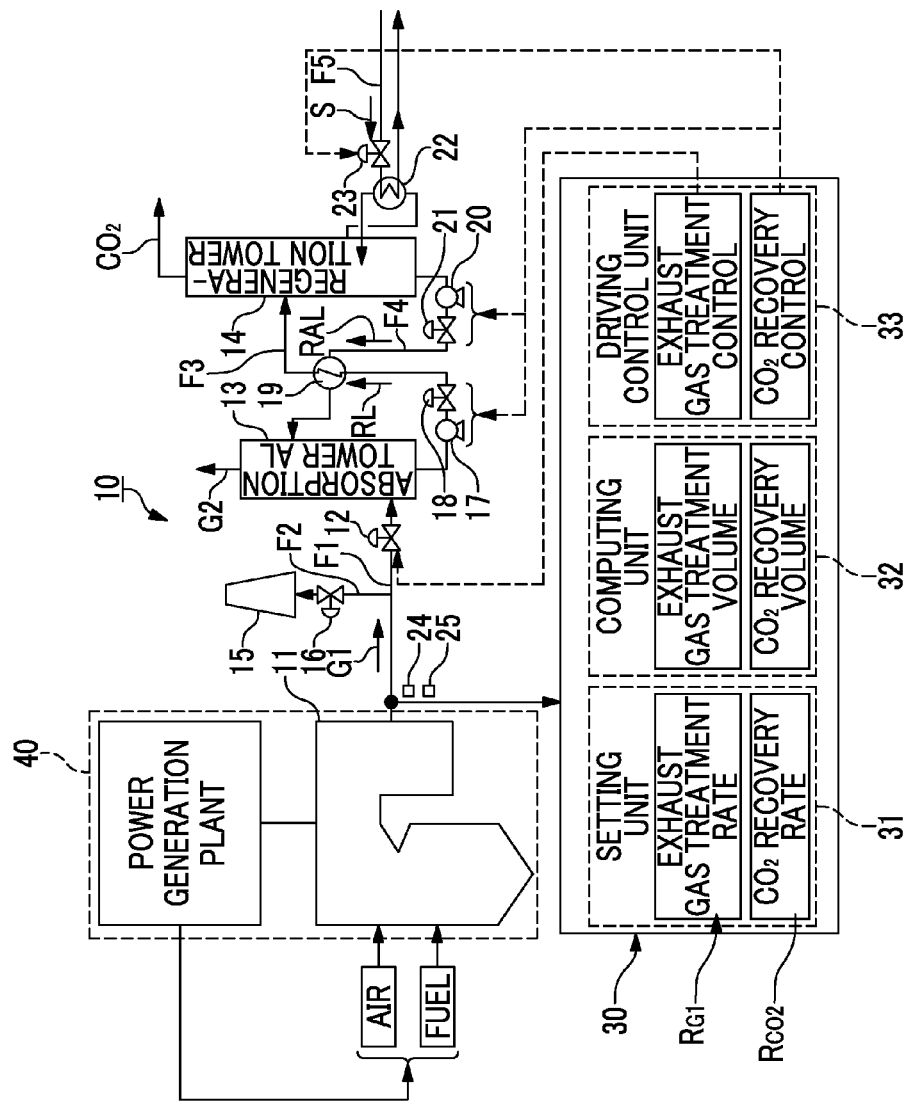
FIG. 1 is a view showing the configuration of a $CO_2$ recovery device according to a first embodiment.

As shown in FIG. 1, the $CO_2$ recovery device (hereinafter simply referred to as a recovery device) 10 includes, for example, an absorption tower 13 that brings exhaust gas G1 containing $CO_2$ and $O_2$, which are discharged from a boiler 11 constituting a power generation plant 40 using fossil fuels, into contact with an absorbent AL, to eliminate $CO_2$ from the exhaust gas G1, and a regeneration tower 14 that discharges $CO_2$ from a rich solution RL that is the absorbent that has absorbed $CO_2$, to regenerate the absorbent AL, as main constituent elements. In the recovery device 10, a lean solution RAL that is the regenerated absorbent from which $CO_2$ has been eliminated by the regeneration tower 14 is reused as absorbent AL by the absorption tower 13.

Additionally, the recovery device 10 includes a recovery control unit 30. The recovery control unit 30 functions so as to cause the recovery rate of $CO_2$ to follow a constant rate and realize partial treatment of the exhaust gas, even if the load of the power generation plant 40 located on an upstream side fluctuates and the volume of the exhaust gas fluctuates.

In the recovery device 10, the exhaust gas G1 containing $CO_2$ from the boiler 11 is sent to the absorption tower 13 through a flow channel F1 that connects the boiler 11 and the absorption tower 13. A main valve 12 that adjusts the volume of the exhaust gas G1 to be supplied to the absorption tower 13 is provided on the flow channel F1.

A flow channel F2 branches from the flow channel F1, and a tip of the flow channel F2 where the branch valve 16 is provided is connected to a chimney 15. When a portion in the exhaust gas G1 discharged from the boiler 11 is sent from a system without being sent to the absorption tower 13, the exhaust gas G1 is discharged from the chimney 15 via the flow channel F2. The branch valve 16 adjusts the volume of discharge of the exhaust gas G1 from the chimney 15.

An exhaust gas flow rate sensor 24 that measures the flow rate (actual exhaust gas flow rate or measurement value $V_{G1}$) of the whole exhaust gas G1 discharged from the boiler 11, and a $CO_2$ concentration sensor 25 that measures the concentration (measurement value $Y_{CO2}$) of $CO_2$ contained in the exhaust gas G1 are provided on the flow channel F1. The information (measurement value $V_{G1}$, measurement value $Y_{CO2}$) measured by the exhaust gas flow rate sensor 24 and the $CO_2$ concentration sensor 25 is continuously transmitted to the recovery control unit 30 during the operation of the power generation plant 40 and the boiler 11. The actual volume of $CO_2$ contained in the exhaust gas G1 can be obtained by multiplying the measurement value $V_{G1}$ by the measurement value $Y_{CO2}$.

In addition, the invention does not hinder providing other elements, such as a blower that raises the pressure of the exhaust gas, a cooling tower that cools the exhaust gas G1, and a denitration/desulfurization facility, between the boiler 11 and the absorption tower 13.

In the absorption tower 13, the exhaust gas G1 comes into countercurrent contact with the absorbent AL having, for example, an amine-based solution as a base, and $CO_2$ in the exhaust gas G1 is absorbed into the absorbent AL by a chemical reaction. In contrast, the exhaust gas G2 after $CO_2$ has been eliminated comes into vapor-liquid contact with condensed water containing the absorbent AL supplied to the absorption tower 13, and the absorbent AL accompanied with the exhaust gas G2 is recovered, and is then discharged from the system.

Additionally, the rich solution RL that has absorbed $CO_2$ is raised in pressure by a rich solvent pump 17, is heated by the lean solution RAL, which is the absorbent regenerated by the regeneration tower 14, in a rich/lean solvent heat exchanger 19 via a rich solvent valve 18, and is supplied to the regeneration tower 14. The absorption tower 13 and the regeneration tower 14 are connected by a flow channel F3, and the rich solvent pump 17, the rich solvent valve 18, and the rich/lean solvent heat exchanger 19 are provided in order from the absorption tower 13 side in the flow channel F3. The rich solution RL that has absorbed $CO_2$ is supplied to the regeneration tower 14 through the flow channel F3.

The rich solution RL discharged from an upper portion of the regeneration tower 14 to the inside thereof causes an endothermic reaction, and discharges a large portion of $CO_2$. The absorbent that has discharged a portion or a large portion of $CO_2$ within the regeneration tower 14 is referred to as a semi-lean solution RAL. When the semi-lean solution RAL reaches the lower portion of the regeneration tower 14, the solution is turned into the absorbent from which almost all $CO_2$ has been eliminated, that is, a lean solution RAL. The lean solution RAL is superheated with steam S by the regeneration superheater 22, and is supplied to the inside of the regeneration tower 14 as steam. The steam S supplied to the regeneration superheater 22 is circulated, for example, between the regeneration superheater and the power generation plant 40. Also, the supply volume of the steam S supplied to the regeneration superheater 22 is controlled by a steam valve 23 provided on a flow channel F5.

Meanwhile, $CO_2$ gas ($CO_2$) accompanied with the steam, which is discharged from the rich solution RL and the semi-lean solution RAL within the regeneration tower, is drawn from a top portion of the regeneration tower 14. The $CO_2$ gas is discharged from the system and separately recovered after steam is condensed, for example by a condenser, and water is separated by a separation drum. The recovered $CO_2$ gas is pressed into an oil field on the basis of an enhanced oil recovery (EOR) method, or is stored in a water bearing stratum to establish global warming countermeasures. In addition, the separated water is supplied to the upper portion of the regeneration tower 14.

The regenerated absorbent (lean solution RAL) is pumped by a lean solvent pump 20, and is sent toward the rich/lean solvent heat exchanger 19 via a lean solvent valve 21. Also, the lean solution RAL is supplied to the absorption tower 13 after being cooled by the rich solution RL in the rich/lean solvent heat exchanger 19. The regeneration tower 14 and the absorption tower 13 are connected by a flow channel F4, and the lean solvent pump 20, the lean solvent valve 21, and the rich/lean solvent heat exchanger 19 are provided in order from the regeneration tower 14 side in the flow channel F4. The lean solution RAL is returned to the absorption tower 13 through the flow channel F4.

By repeating a series of the aforementioned cycles, the recovery device 10 recovers $CO_2$ continuously from the exhaust gas G1 discharged from the boiler 11. In this process, the recovery control unit 30 adjusts the opening degrees of the main valve 12 and the branch valve 16 to control the volume (exhaust gas treatment rate) of the exhaust gas G1 to be treated by the recovery device 10. Additionally, the recovery control unit 30 adjusts the operation and opening degrees of the rich solvent pump 17, the rich solvent valve 18, the lean solvent pump 20, the lean solvent valve 21, and the steam valve 23 to control the volume ($CO_2$ recovery volume) of $CO_2$ to be recovered by the absorption tower 13 and the regeneration tower 14. The first embodiment to fifth embodiment to be described below have respective features in these control contents. However, all the embodiments are common in that causing the exhaust gas recovery rate to follow a constant rate and partially treating the exhaust gas can be achieved, even if an exhaust gas flow rate fluctuates as the load of the power generation plant 40 on the upstream side of the recovery device 10 fluctuates.

The configuration of the power generation plant 40 is arbitrary, and the power generation plant may include a high-pressure turbine that is driven by drawing the steam generated by the boiler 11, an intermediate-pressure turbine that is driven by drawing reheated steam returned from the high-pressure turbine and heated again by the boiler 11, a low-pressure turbine that draws and drives the steam decompressed by generating power by the intermediate-pressure turbine, and a condenser that condenses the steam decompressed by generating power with the low-pressure turbine.

First Embodiment

The recovery control unit 30 according to a first embodiment, as shown in FIG. 1, includes a setting unit 31 that sets operation parameters and the other parameters, a computing unit 32, and a driving control unit 33. Hereinafter, also refer to FIG. 2.

Figure 2:
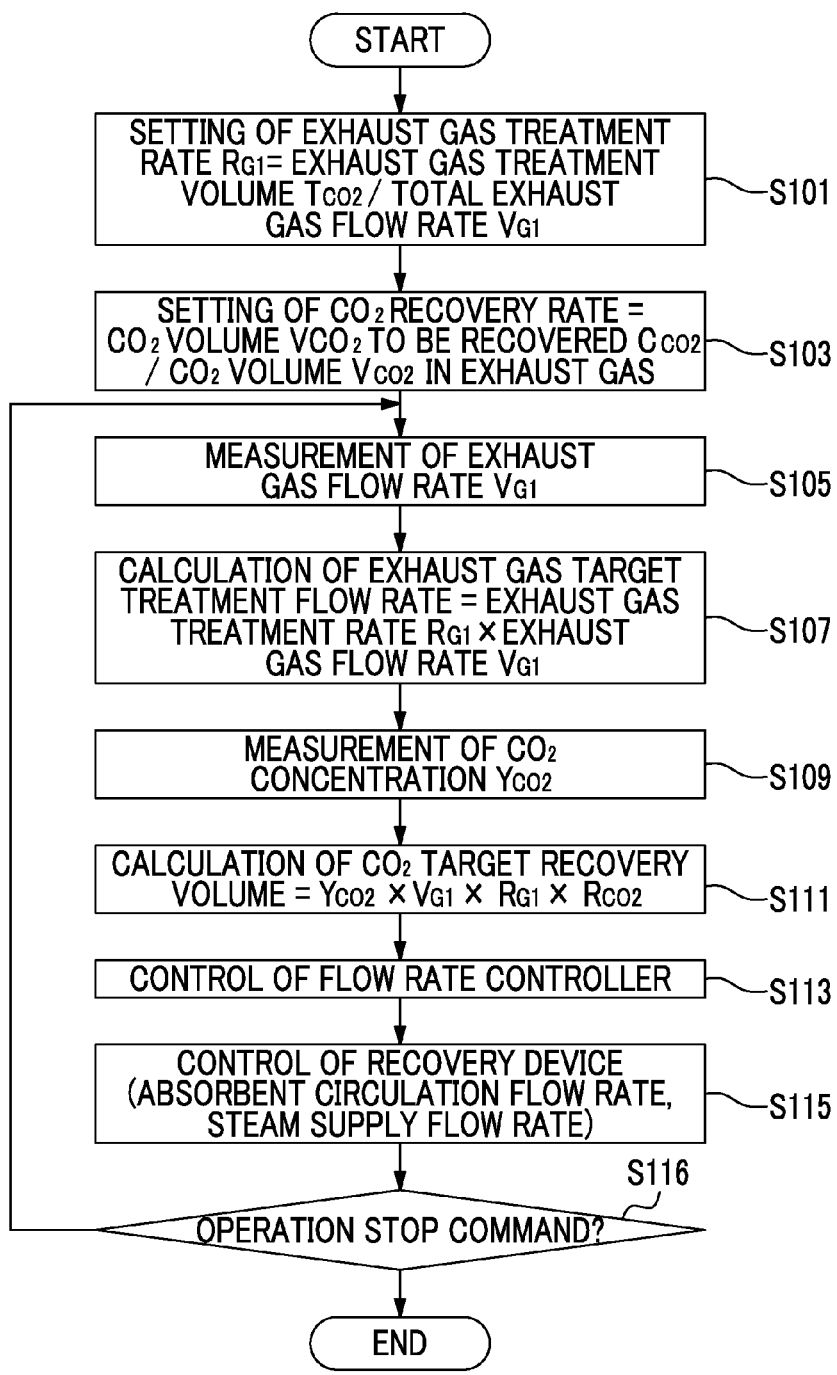
FIG. 2 is a flow view showing a control procedure of the $CO_2$ recovery device according to the first embodiment.

An exhaust gas treatment rate $R_{G1}$ and a $CO_2$ recovery rate $R_{CO2}$ as the operation parameters are input to and set in the setting unit 31 (Steps S101 and 103 in FIG. 2).

The exhaust gas treatment rate $R_{G1}$ is a setting value determined by the following formula when the flow rate of the exhaust gas G1 discharged from the boiler 11 is $V_{G1}$ and the volume of the exhaust gas G1 to be treated by the recovery device 10 is $T_{CO2}$.

$$R_{G1} = T_{CO2}/V_{G1}$$

Additionally, the $CO_2$ recovery rate $R_{CO2}$ is a setting value determined by the following formula when the volume of $CO_2$ contained in the exhaust gas G1 to be treated by the recovery device 10 is $V_{CO2}$ and the volume of $CO_2$ to be recovered is $C_{CO2}$.

$$R_{CO2} = C_{CO2}/V_{CO2}$$

The recovery control unit 30 continues acquiring information on the actual flow rate (measurement value $V_{G1}$) of the exhaust gas G1 discharged from the boiler 11, from the exhaust gas flow rate sensor 24 (Step S105 in FIG. 2). Additionally, the recovery control unit 30 continues acquiring information on the concentration (measurement value $Y_{CO2}$) of $CO_2$ contained in the exhaust gas G1 discharged from the boiler 11, from the $CO_2$ concentration sensor 25 (Step S109 in FIG. 2).

In the recovery control unit 30, the computing unit 32 multiplies the measurement value $V_{G1}$ acquired from the exhaust gas flow rate sensor 24 by the exhaust gas treatment rate $R_{G1}$ set as a parameter, and sets the target flow rate of the exhaust gas G1 to be treated by $CO_2$ recovery device 10 (Step S107 in FIG. 2). The driving control unit 33 controls the opening degrees of the main valve 12 and the branch valve 16 (flow rate controller) on the basis of the setting value (Step S113 in FIG. 2).

For example, when the exhaust gas treatment rate $R_{G1}$ is set to 100%, in order to treat the whole volume of the measurement value $V_{G1}$ with the recovery device 10, the main valve 12 is fully opened, whereas the branch valve 16 is fully closed. Then, even if the load of the power generation plant 40 fluctuates and the flow rate of the exhaust gas G1 discharged from the boiler 11 fluctuates, all the exhaust gas G1 is supplied to the absorption tower 13 through the flow channel F1.

Additionally, for example, when the exhaust gas treatment rate $R_{G1}$ is set to 50%, the volume of 50% of the measurement value $V_{G1}$ is treated by the recovery device 10, and the remaining 50% is discharged from the system via the chimney 15. Therefore, for example, the opening degree of the main valve 12 is made to be 50%, whereas the opening degree of the branch valve 16 is made to be 50%. Then, even if the load of the power generation plant 40 fluctuates and the flow rate of the exhaust gas G1 discharged from the boiler 11 fluctuates, only 50% of the exhaust gas G1 is supplied to the absorption tower 13 through the flow channel F1. Thus, partial treatment of the exhaust gas is realized, maintaining the set exhaust gas treatment rate $R_{G1}$.

Additionally, in the recovery control unit 30, the computing unit 32 performs multiplication of four values including the measurement value $P_{CO2}$ ($CO_2$ concentration in the exhaust gas) acquired from the $CO_2$ concentration sensor 25, the measurement value $V_{G1}$ acquired from the exhaust gas flow rate sensor 24, and the exhaust gas treatment rate $R_{G1}$ and the $CO_2$ recovery rate $R_{CO2}$ that are set as parameters, and uses the resulting value as a target value of the volume of $CO_2$ to be treated and recovered by the recovery device 10 (Step S111 in FIG. 2). Moreover, the computing unit 32 calculates an absorbent circulation flow rate and a steam supply flow rate, which are the operation parameters of the recovery device 10, on the basis of this setting value. Here, the absorbent circulation flow rate can be controlled by adjusting the rich solvent pump 17, the rich solvent valve 18, the lean solvent pump 20, and the lean solvent valve 21, and the steam supply flow rate can be controlled by adjusting the steam valve 23. Accordingly, the driving control unit 33 controls the volume of $CO_2$ to be recovered by adjusting the discharge volumes of the rich solvent pump 17 and the lean solvent pump 20 and the opening degrees of the rich solvent valve 18, the lean solvent valve 21, and the steam valve 23 on the basis of the absorbent circulation flow rate and the steam supply flow rate that are calculated by the computing unit 32 (Step S115 in FIG. 2).

The aforementioned control procedure is continuously executed until there is a operation stop command of the power generation plant 40 (Step S116 in FIG. 2).

As described above, according to the first embodiment, even if the load of the boiler 11 that is an apparatus on the upstream side of the recovery device 10 fluctuates, and the flow rate of the exhaust gas G1 fluctuate, the $CO_2$ recovery rate can be made to follow a constant rate, and the exhaust gas can be partially treated.

Second Embodiment

A $CO_2$ recovery device 110 of a second embodiment is the same as that of the first embodiment except that the flow rate (measurement value $V_{G1}$) of the exhaust gas G1 discharged from the boiler 11 and the concentration (measurement value $Y_{CO2}$) of $CO_2$ contained in the exhaust gas is not measured, but is obtained by calculation. Accordingly, differences from the first embodiment will mainly be described below.

Figure 3:
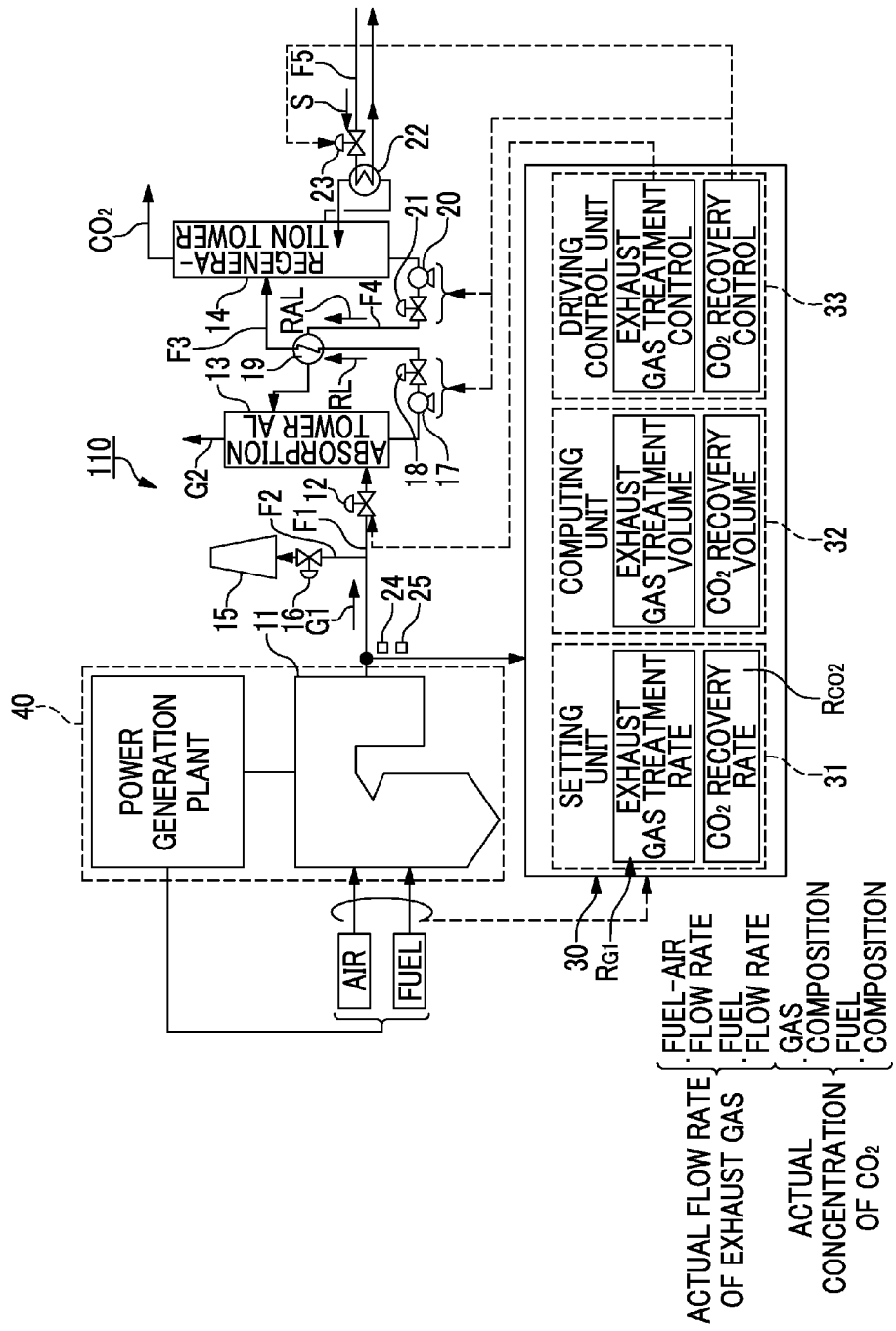
FIG. 3 is a view showing the configuration of a $CO_2$ recovery device according to a second embodiment.

In the second embodiment, as shown in FIG. 3, the flow rate (measurement value Va) of combustion air and the flow rate (measurement value Vf) of fuel to be supplied to the boiler 11 are measured instead of the measurement value $V_{G1}$, and the total value (measurement value Vf+measurement value Va) of these values is used as an alternative value to the measurement value $V_{G1}$ (the actual flow rate of the exhaust gas G1) of the first embodiment.

Alternatively, since the combustion air and the fuel to be supplied to the boiler 11 are usually set in advance, setting values (a setting value Va and a setting value Vf) can also be used as alternative values of the measurement value Va and the measurement value Vf.

Additionally, in the second embodiment, as shown in FIG. 3, when the composition of the fuel and the air to be supplied to the boiler 11 is known, the $CO_2$ concentration is obtained by calculating a gas composition after combustion, and is used as an alternative value of the measurement value $Y_{CO2}$ of the first embodiment.

As described above, the flow rate of the exhaust gas G1 can be directly obtained by measurement as in the first embodiment, and can be indirectly determined by calculation from the combustion air flow rate (the measurement value Va or the setting value Va) and the fuel flow rate (the measurement value Vf or the setting value Vf) as in second embodiment. Similarly, the $CO_2$ concentration can be directly obtained by measurement as in the first embodiment, and can be obtained by calculation on the basis of the composition of the air and the fuel to be supplied as in the second embodiment. Since the exhaust gas actual flow rate and the $CO_2$ concentration that are obtained by calculation have sufficient precision as the alternative values of the exhaust gas flow rate and the $CO_2$ concentration obtained by measurement, the same effects as in the first embodiment can also be obtained in the second embodiment.

In addition, there is an advantage that the actual flow rate of the exhaust gas G1 from the boiler 11 that is generally difficult to be precisely measured can be obtained in the second embodiment from the air flow rate and the fuel flow rate that are relatively easily measured. The same applies for the concentration of $CO_2$ contained in the exhaust gas G1 from the boiler 11, and the composition of the exhaust gas from the boiler 11 can be relatively easily obtained by calculation from fuel and air from which it is difficult to continuously measure the $CO_2$ concentration and that has an almost constant composition.

Third Embodiment

Figure 4:
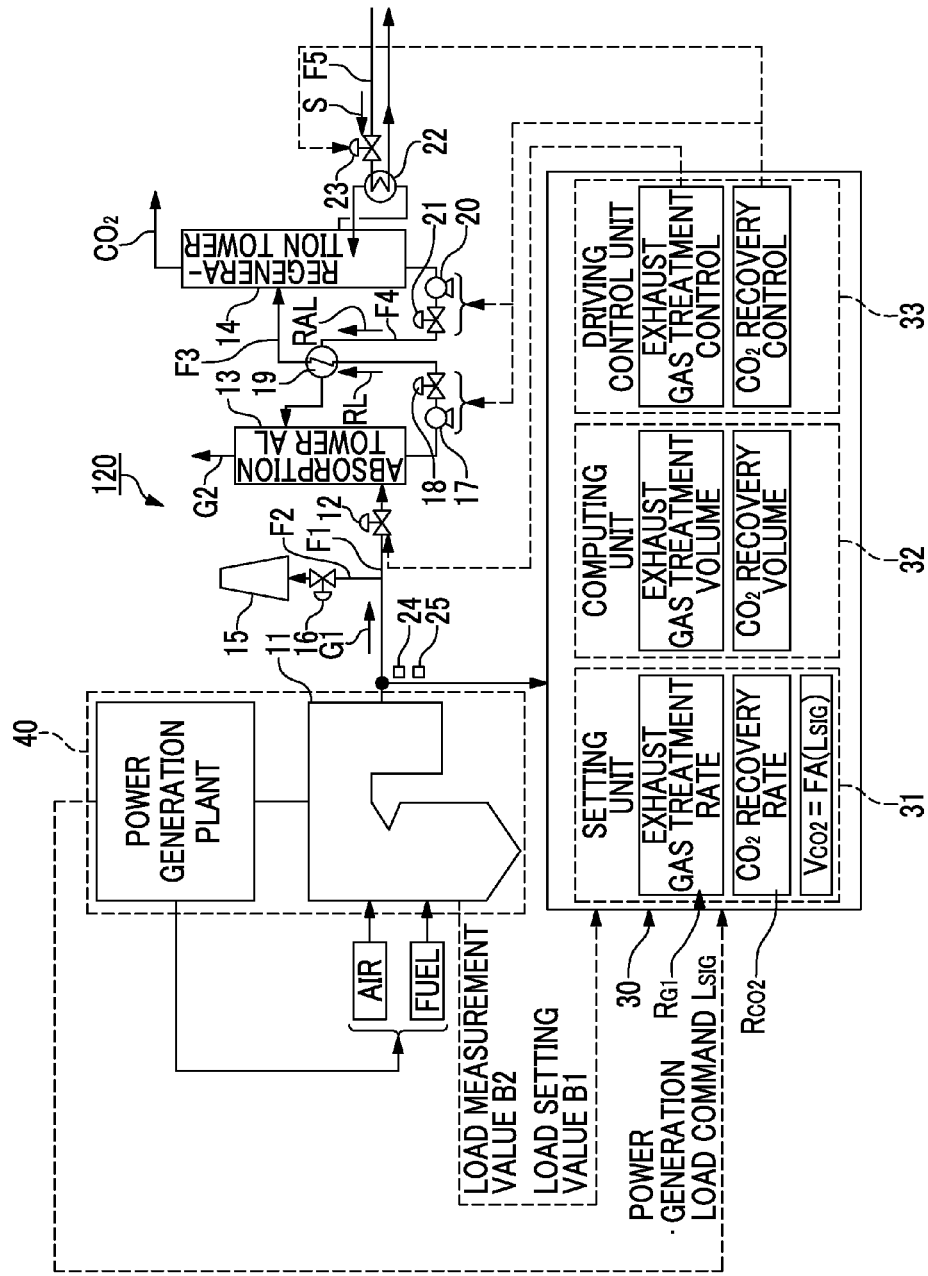
FIG. 4 is a view showing the configuration of a $CO_2$ recovery device according to a third embodiment.

A recovery device 120 of the third embodiment aims at improving the followability when the load of the boiler that is an upstream facility fluctuates greatly. Therefore, the third embodiment uses a target value of power generation output control in the power generation plant 40 as a load command signal, and prepares table data in which the load command signal and the volume $V_{CO2}$ of $CO_2$ contained in the exhaust gas G1 are matched. The table data, as shown in FIG. 4, is stored in the setting unit 31 of the recovery control unit 30. The table data is given as the following function, for example.

$V_{CO2}=FA(L_{SIG})L_{SIG}$: Load command signal

As for the recovery device 120, the recovery control unit 30 acquires the load command signal $L_{SIG}$ from the power generation plant 40. The recovery control unit 30 specifies $CO_2$ volume ($V_{CO2}=FA(L_{SIG})$) by referring to the aforementioned table data while acquiring the load command signal $L_{SIG}$. Then, the computing unit 32 determines $CO_2$ target recovery volume (estimation value) on the basis of the following formulas.

$CO_2$ target recovery volume$=FA(L_{SIG})\times$Exhaust gas treatment rate $R_{G1}\times CO_2$ recovery rate $R_{CO2}$ The recovery device 120 according to the third embodiment uses the aforementioned estimation value as the volume of $CO_2$ to be recovered while the load of the boiler fluctuates largely, and the first embodiment (second embodiment) may be applied apart from this. Therefore, the recovery device 120 adopts the following procedure.

Figure 5:
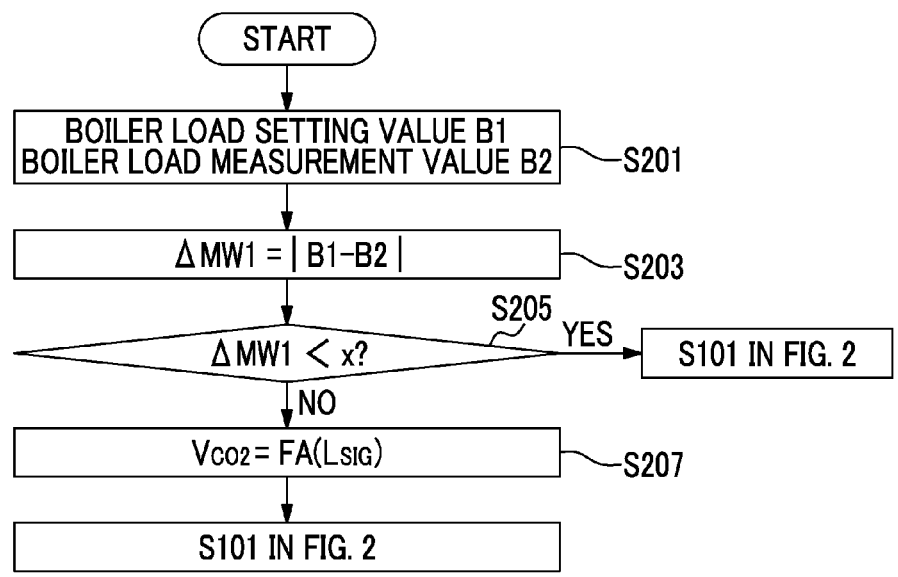
FIG. 5 is a flow view showing a control procedure of the $CO_2$ recovery device according to the third embodiment.

As shown in FIGS. 4 and 5, the recovery control unit 30 acquires a load setting value B1 of the boiler 11 and acquires a load measurement value B2 of the boiler 11 (Step S201 in FIG. 5). In addition, the load measurement values of the boiler 11 can be obtained by calculation from the fuel flow rate, the volume of steam generation, and the like.

The recovery control unit 30 further obtains a difference ΔMW1 (absolute value) between the load setting value B1 and the load measurement value B2, and compares this difference ΔMW1 with a default value x (Step S203 in FIG. 5). If the difference ΔMW1 between the load setting value B1 and the load measurement value B2 is large, it is determined that the load of the boiler 11 fluctuates largely.

If the difference is less than the default value x, the processing proceeds to Step S101 of FIG. 2. In the following steps, the operation of the recovery device 10 is performed in the same procedure as in the first embodiment.

In contrast, if the difference is equal to or greater than the default value x, the recovery control unit 30 specifies, on the basis of the acquired load command signal (Step S205 in FIG. 5), the volume $V_{CO2}$ of $CO_2$ in the exhaust gas G1 from the table data (FA($L_{SIG}$)) (Step S207 in FIG. 5).

Thereafter, the processing proceeds to Step S101 of FIG. 2, and the operation of the recovery device 120 is performed in the same procedure as in the first embodiment. However, the table data (FA ($L_{SIG}$)) is used instead of the calculation of the $CO_2$ target recovery volume (Step S111 in FIG. 2).

As described above, since the recovery device 10 according to the third embodiment includes the same effects as the first embodiment and can set the $CO_2$ target recovery volume in advance, the followability of the boiler 11 to load fluctuations is improved.

Fourth Embodiment

The recovery device 10 uses a portion of steam generated by the power generation plant 40, more specifically, by the boiler 11, as a supply destination of steam required for the regeneration tower 14. Accordingly, when the volume of steam to be supplied to the regeneration tower 14 increases, there is a risk that the power generation capacity in the power generation plant 40 may be just as impaired. Therefore, in the fourth embodiment, the power generation capacity of the power generation plant 40 can be guaranteed by determining an upper limit of a $CO_2$ recovery volume capable of being recovered in the recovery device 130, that is, by setting a limit to the load of the recovery device 130 when required.

Figure 6:
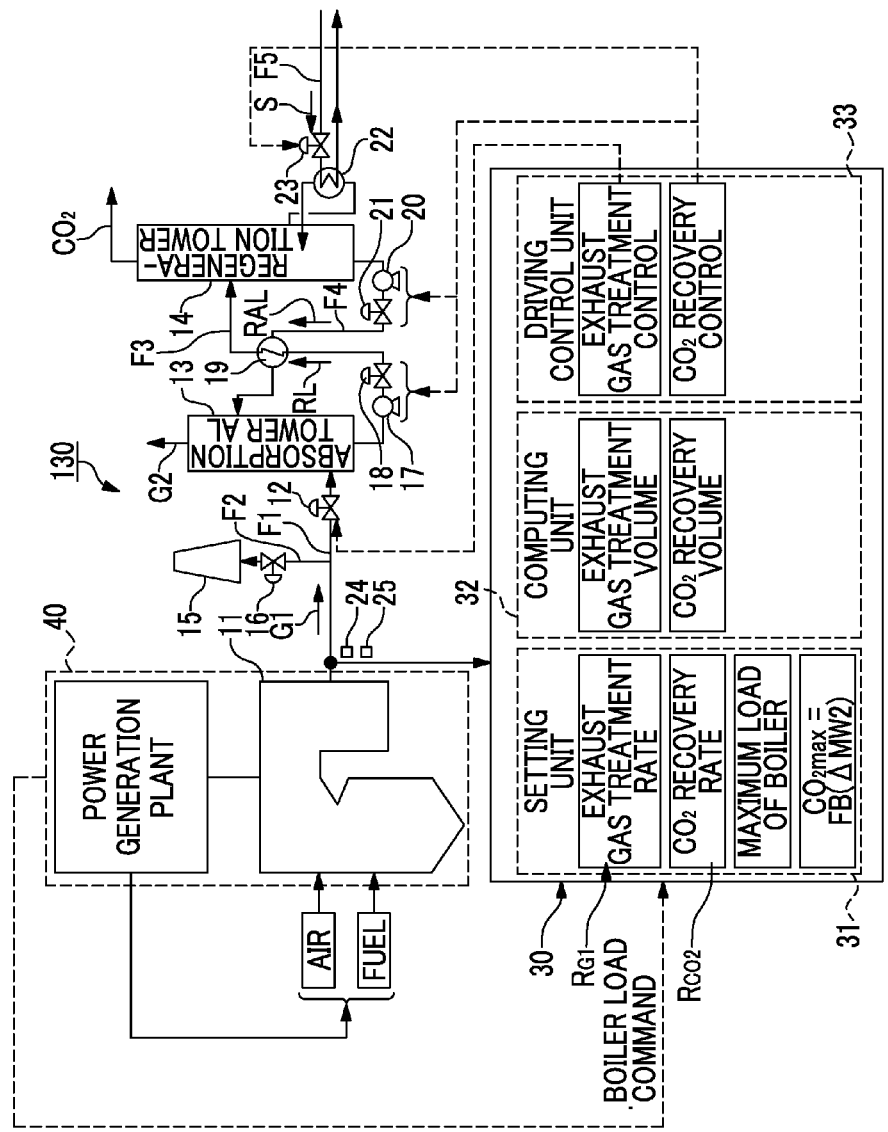
FIG. 6 is a view showing the configuration of a $CO_2$ recovery device according to a fourth embodiment.

Therefore, the recovery control unit 30 of the fourth embodiment, as shown in FIG. 6, acquires the target value of the power generation output control as a load command signal $B_{SIG}$ of the boiler 11. Additionally, the recovery control unit 30 holds a maximum load $B_{max}$ of the boiler 11.

For example, if the value of power generation output becomes close to the maximum load $B_{max}$ of the boiler 11, it can be said that the remaining power that can be allocated to the recovery device 130 from the load of the boiler 11 is small. Thus, the recovery control unit 30 obtains a difference ΔMW2 between the maximum load $B_{max}$ of the boiler 11 and the load command signal $B_{SIG}$, in order to determine the remaining power of the boiler 11. The remaining power of the boiler 11 becomes larger as this difference is larger, and in contrast, the remaining power of the boiler 11 becomes smaller as the difference is smaller. Then, the recovery device 130 determines the volume of $CO_2$ capable of being treated and recovered, according to this difference. Therefore, the recovery control unit 30 stores the table data, in which the difference and the volume of $CO_2$ capable of being recovered are matched, in the setting unit 31. The table data is given as the following function, for example.

$$CO_{2max} = FB(MW2)$$

The recovery control unit 30 sets the obtained $CO_2$ volume to a recovery volume upper limit $CO_{2max}$ by referring to the table data while obtaining the difference ΔMW2 serially. Also, the recovery control unit 30 of the fourth embodiment sets a limit so that the $CO_2$ recovery volume obtained in the first embodiment or the second embodiment does not exceed the recovery volume upper limit $CO_{2max}$.

Figure 7:
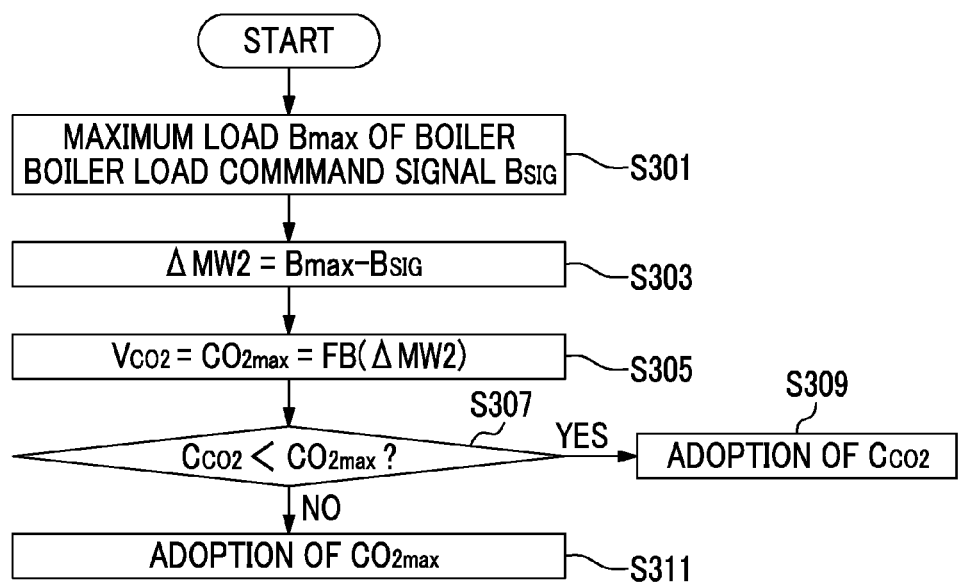
FIG. 7 is a flow view showing a control procedure of the $CO_2$ recovery device according to the fourth embodiment.

The recovery control unit 30 of the fourth embodiment operates the recovery device 10 in a procedure shown in FIG. 7.

The recovery control unit 30 acquires the load command signal $B_{SIG}$ from the power generation plant 40, and obtains the difference ΔMW2 from the maximum load $B_{max}$ of the boiler 11 that the recovery control unit holds (Steps S301 and 303 in FIG. 7).

Next, the recovery control unit 30 specifies $CO_{2max}$ corresponding to the difference ΔMW2 obtained by referring to the table data (Step S305 in FIG. 7).

Next, the recovery control unit 30 compares the size of the target value $C_{CO2}$ with the recovery volume upper limit $CO_{2max}$ (Step S307 in FIG. 7). If the target value $C_{CO2}$ is less than the upper limit $CO_{2max}$ (Yes in Step S307 in FIG. 7), it is determined that the remaining power is in the boiler 11, and the absorbent circulation flow rate and the steam supply flow rate are controlled on the basis of the target value $C_{CO2}$ (Step S309 in FIG. 7). If the target value $C_{CO2}$ is equal to or greater than the upper limit $CO_{2max}$ (No in S307 in FIG. 7), it is determined that there is no remaining power in the boiler 11, and the absorbent circulation flow rate and the steam supply flow rate are controlled on the basis of the upper limit $CO_{2max}$ without adopting the target value $C_{CO2}$ (Step S311 in FIG. 7).

As described above, according to the fourth embodiment, the same effects as in the first embodiment can be exhibited, and when priority is given to the power generation output, the setting value of the $CO_2$ target recovery volume can be automatically lowered. Additionally, even if the exhaust gas treatment rate is erroneously set to a high value, the power generation plant 40 can be operated without reducing the power generation output.

Fifth Embodiment

In a recovery device 140 of a fifth embodiment, the setting unit 31 of the recovery control unit 30 holds table data in which a boiler load command (a fuel flow rate setting value and an air flow rate setting value) $B_{SIG}$ and an absorbent circulation flow rate setting value $C_L$ are matched. The table data is given as the following function.

$$C_L = FC(B_{SIG})$$

Figure 8:
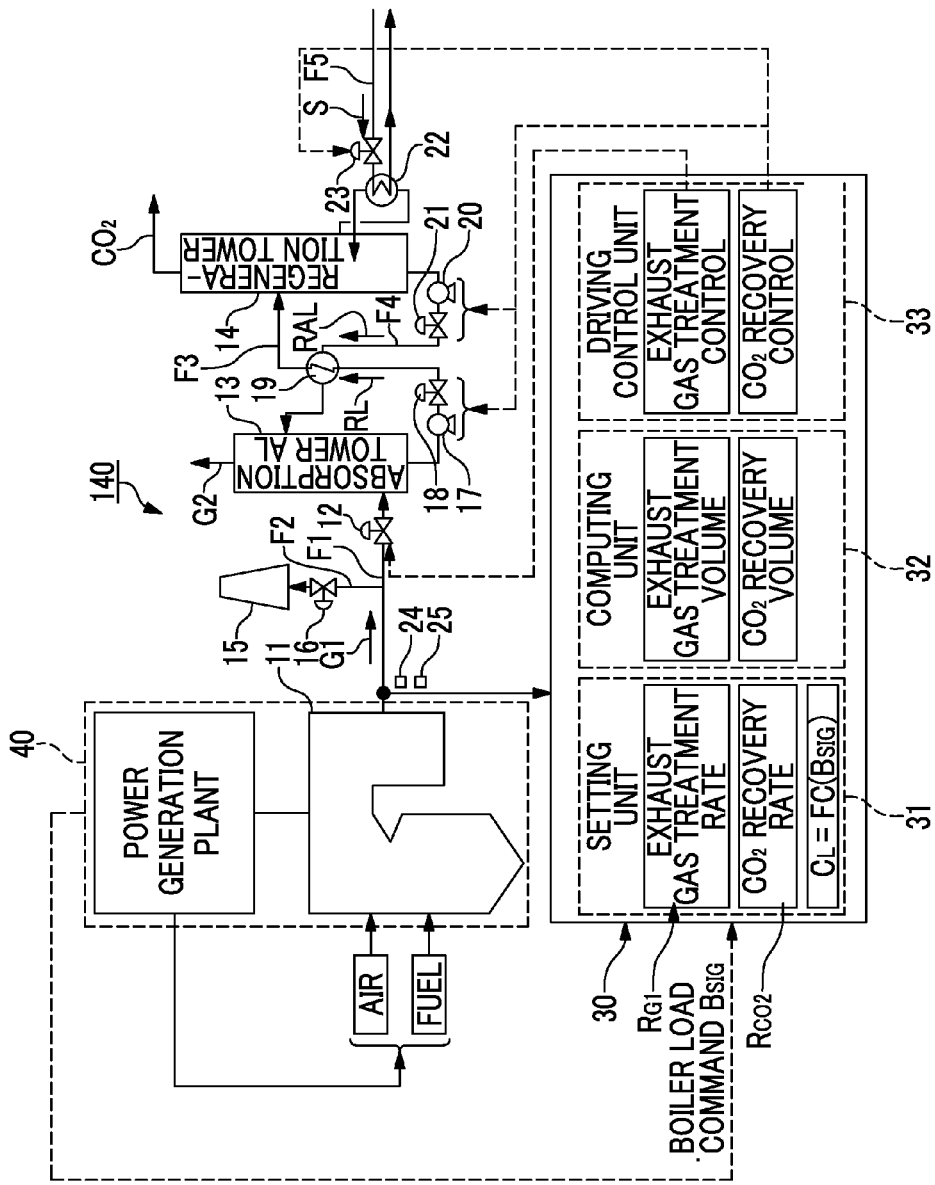
FIG. 8 is a view showing the configuration of a $CO_2$ recovery device according to a fifth embodiment.

The recovery control unit 30, as shown in FIG. 8, acquires the boiler load command $B_{SIG}$, refers to the table data ($C_L$=FC($B_{SIG}$)) of the setting unit 31 to thereby specify the absorbent circulation flow rate setting value $C_L$, and performs a control so that an actual absorbent circulation flow rate reaches the setting value. It is noted herein that the absorbent circulation flow rate setting value $C_L$ is obtained by multiplying the exhaust gas treatment rate by the $CO_2$ recovery rate. The absorbent circulation flow rate is controlled by adjusting the rich solvent pump 17, the rich solvent valve 18, or the like. The calculation of the $CO_2$ target recovery volume may use any method of the first embodiment to the third embodiment.

According to the fifth embodiment, the same effects as in the first embodiment are exhibited, and even if the flow rate of the exhaust gas G1 fluctuates abruptly, the followability of the boiler 11 to load fluctuations is improved by causing the absorbent circulation flow rate to fluctuate so as to follow the flow rate fluctuations. At this time, the $CO_2$ recovery rate in the absorption tower 13 does not decline.

In the aforementioned embodiments, the example in which the $CO_2$ generated by the boiler 11 of the power generation plant 40 is recovered has been described. However, the target of the invention is not limited to this, and the invention can also be applied to arbitrary apparatuses and facilities that generate $CO_2$.

Additionally, the rich solvent pump 17, the lean solvent pump 20, or the like is shown as means for controlling the circulation flow rate of the absorbent, and this is also an example and means that can control the circulation flow rate of the absorbent can be widely applied.

Additionally, a supply source of the steam for recovering the absorbent is not limited to the power generation plant 40 and can be individually provided.

In addition to this, the configurations mentioned in the aforementioned embodiments can be selected or can be appropriately changed to other configurations so long as the configurations do not depart from the concept of the invention.

REFERENCE SIGNS LIST

G1, G2: exhaust gas
10, 110, 120, 130, 140: $CO_2$ recovery device
11: boiler
12: main valve
13: absorption tower
14: regeneration tower
15: chimney
16: branch valve
17: rich solvent pump
18: rich solvent valve
19: rich/lean solvent heat exchanger
20: lean solvent pump
21: lean solvent valve
22: regeneration superheater
23: steam valve
24: exhaust gas flow rate sensor
25: $CO_2$ concentration sensor
30: recovery control unit
31: parameter setting unit
32: computing unit
33: driving control unit
40: power generation plant

The invention claimed is:

1. A $CO_2$ recovery device comprising:
a $CO_2$ absorption tower that brings an exhaust gas containing $CO_2$ into contact with an absorbent to eliminate $CO_2$ in the exhaust gas;
a control unit that controls a volume of the exhaust gas to be treated;
a first flow channel in which the exhaust gas flows from a generation source to the $CO_2$ absorption tower and on which a first valve is provided;
a second flow channel that branches from the first flow channel and on which a second valve is provided, wherein the first flow channel includes on an upper stream side from the second flow channel;
an exhaust gas flow rate sensor that measures a flow rate of the exhaust gas;
a $CO_2$ concentration sensor that measures a concentration of $CO_2$ contained in the exhaust gas, wherein the control unit controls the volume of the exhaust gas to be treated by adjusting opening degrees of the first valve and the second valve; and
a regeneration tower that eliminates and regenerates $CO_2$ in a rich solution that has absorbed $CO_2$ in the $CO_2$ absorption tower,
wherein the absorbent, which is a lean solution from which $CO_2$ is eliminated in the regeneration tower, is reused in the $CO_2$ absorption tower,
wherein the $CO_2$ recovery device operates based on an exhaust gas treatment rate $R_{G1}$ and a $CO_2$ recovery rate $R_{CO2}$, which satisfy conditional expressions (1) and (2) below, $$R_{G1}=T_{CO2}/V_{G1}, \text{where} \quad (1)$$

$V_{G1}$: Flow rate of exhaust gas discharged from generation source of exhaust gas; and
$T_{CO2}$: Volume of exhaust gas to be treated by $CO_2$ recovery device, and $$R_{CO2}=C_{CO2}/V_{CO2}, \text{where} \quad (2)$$

$V_{CO2}$: Volume of $CO_2$ contained in exhaust gas to be treated by $CO_2$ recovery device; and
$C_{CO2}$: Volume of $CO_2$ to be recovered by $CO_2$ recovery device,
wherein the $CO_2$ recovery device sets a target treatment volume for exhaust gas on the basis of the product of an actual flow rate of the exhaust gas discharged toward the $CO_2$ recovery device from the generation source of the exhaust gas, and the exhaust gas treatment rate $R_{G1}$, and
wherein the $CO_2$ recovery device sets a target recovery volume for $CO_2$ on the basis of the product of an actual volume of $CO_2$ contained in the exhaust gas discharged from the generation source of the exhaust gas to the $CO_2$ recovery device, the exhaust gas treatment rate $R_{G1}$, and the $CO_2$ recovery rate $R_{CO2}$.

2. The $CO_2$ recovery device according to claim 1, wherein the actual flow rate of the exhaust gas discharged toward the $CO_2$ recovery device and the actual volume of $CO_2$ contained in the exhaust gas are obtained by measuring the exhaust gas.

3. The $CO_2$ recovery device according to claim 1, wherein the actual flow rate of the exhaust gas is obtained by calculation on the basis of a flow rate of fuel and a flow rate of combustion gas to be supplied to the generation source of the exhaust gas, and
wherein the actual volume of $CO_2$ contained in the exhaust gas is obtained by calculation on the basis of the flow rates and composition of the fuel and the combustion gas.

4. The $CO_2$ recovery device according to claim 1, wherein if a load of the generation source of the exhaust gas fluctuates beyond a predetermined value, the actual flow rate of the exhaust gas is obtained by collating data in which a load to the generation source of the exhaust gas and the flow rate of the exhaust gas are matched, with a load command signal to the generation source of the exhaust gas, and the recovery volume of the $CO_2$ is specified.

5. The $CO_2$ recovery device according to claim 1, wherein an upper limit of the recovery volume of the $CO_2$ is set on the basis of the load of the generation source of the exhaust gas.

6. The $CO_2$ recovery device according to claim 1, wherein a target value of an absorbent circulation flow rate is set on the basis of the load of the generation source of the exhaust gas.

* * * * *